May 24, 1949. D. P. ALLEN ET AL 2,471,296
JETTISON FUEL TANK
Filed Dec. 14, 1944 2 Sheets-Sheet 1
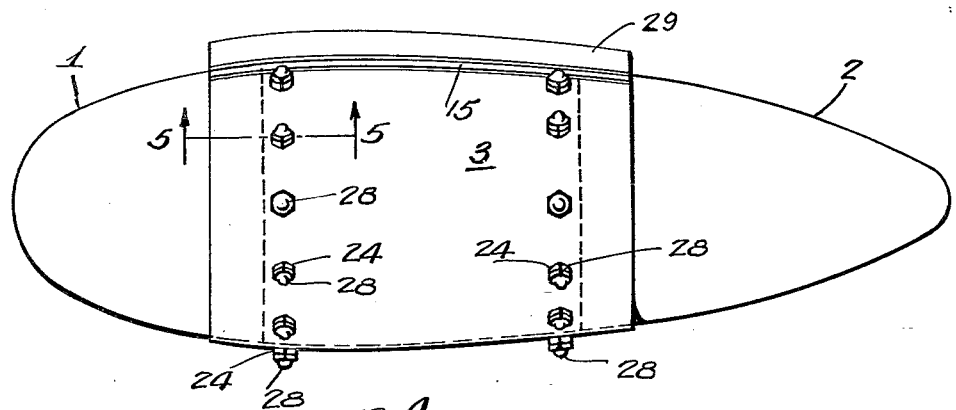
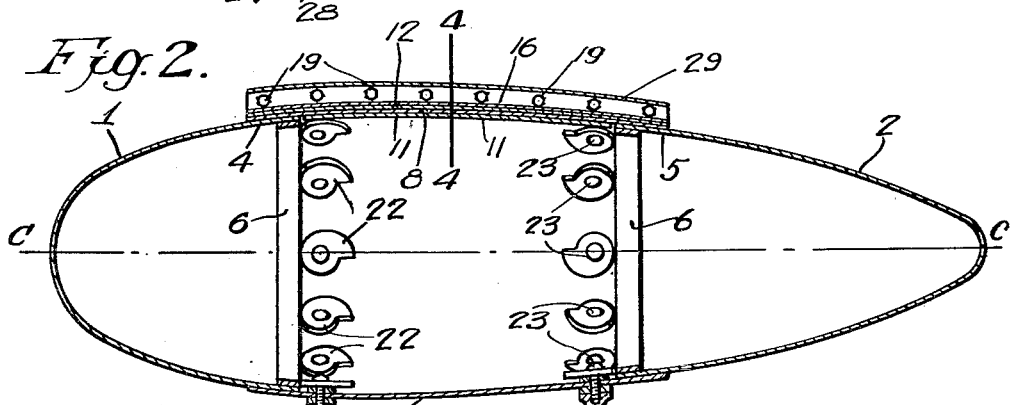
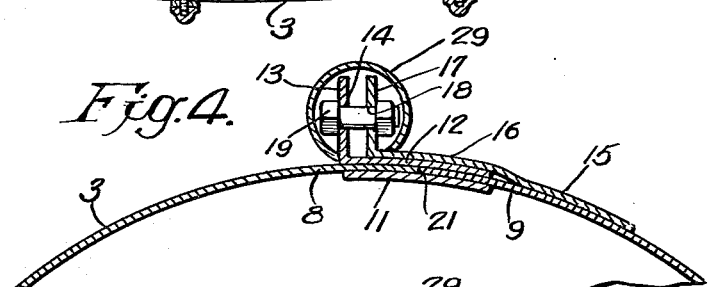
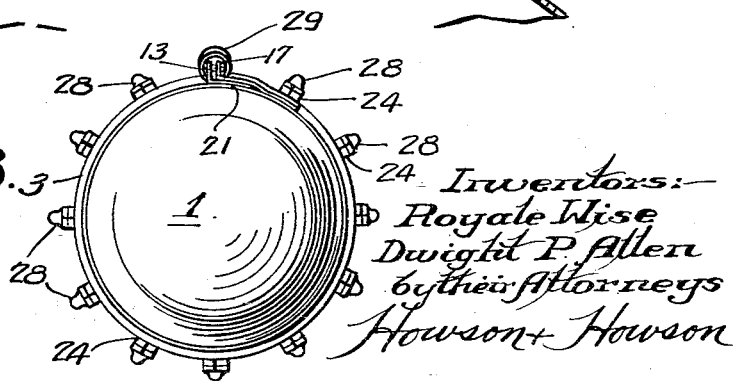
Inventors:
Royale Wise
Dwight P. Allen
by their Attorneys
Howson + Howson May 24, 1949.　　　D. P. ALLEN ET AL　　　2,471,296
JETTISON FUEL TANK
Filed Dec. 14, 1944　　　2 Sheets-Sheet 2
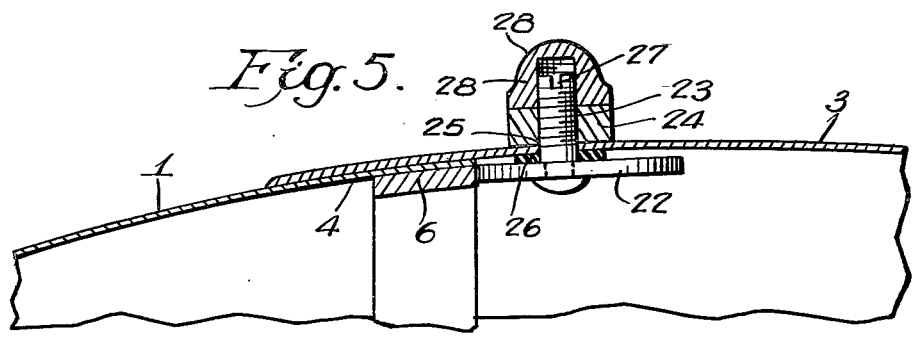
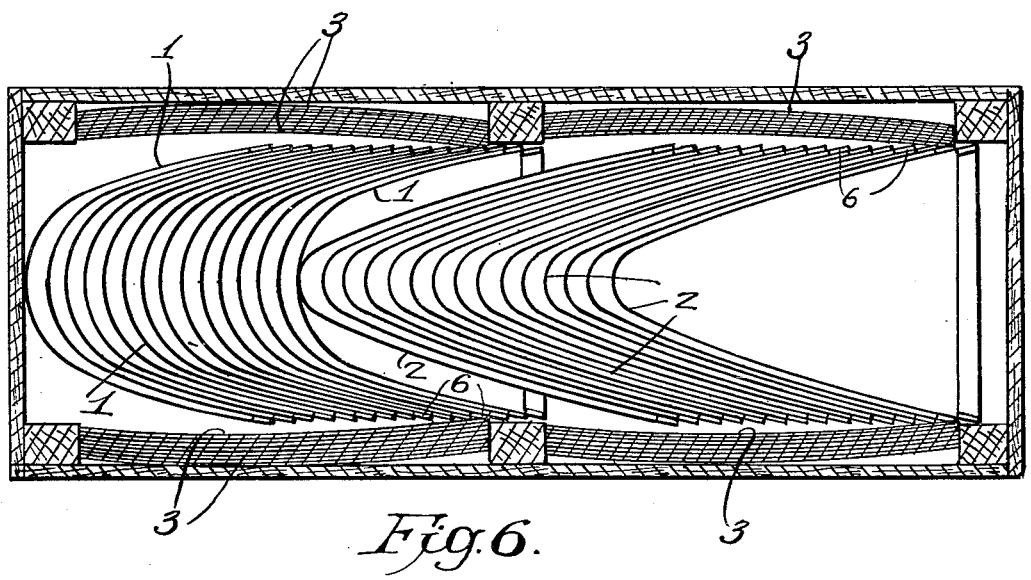
Inventors:-
Royale Wise
Dwight P. Allen
by their Attorneys
Howson + Howson Patented May 24, 1949

2,471,296

UNITED STATES PATENT OFFICE 2,471,296

JETTISON FUEL TANK

Dwight P. Allen, Birmingham, and Royale Wise, Detroit, Mich., assignors to Thermoid Company, Trenton, N. J., a corporation of New Jersey Application December 14, 1944, Serial No. 568,160

3 Claims. (Cl. 220—5)

This invention relates to "jettison" fuel tanks, primarily for airplanes, and a principal object of the invention is to provide a sectional or knock-down tank of this type so designed that in disassembled state the parts of each individual tank and also the corresponding parts of a plurality of tanks may be nested together in a manner to reduce cargo and storage space to a minimum.

Tanks of this class are expendible in that they are designed for use as auxiliary fuel tanks to be released from the airplane in flight when the fuel has been exhausted, or when circumstances render it desirable to jettison the tank either before or after exhaustion of the fuel. Such tanks when produced in the conventional manner take up extensive space in transportation and storage, and it is a primary object of the present invention to provide a novel design wherein the tank is composed of a plurality of sub-assemblies or sections with means for joining these sub-assemblies together in the field by means of simple tools so as to complete the tank, said sub-assemblies being formed so that they may be nested together in multiple in a manner to greatly reduce the amount of space required for transportation and storage.

The invention extends also to certain novel structural features hereinafter described including the means for assembling and securing the said sections together to form the tank.

While the invention relates primarily to jettison fuel tanks, it will be apparent that in certain aspects the invention pertains also to tanks adapted for other uses.

The invention will be more readily understood by reference to the attached drawings wherein:

Figure 1 is a side view of a tank made in accordance with the invention;

Figure 2 is a longitudinal sectional view of the tank;

Figure 3 is an end elevational view of the tank;

Figure 4 is a section on the line 4—4, Figure 2;

Figure 5 is a section on the line 5—5, Figure 1, and

Figure 6 is a sectional view of the separate sections or sub-assemblies of a plurality of the tanks nested together and packed for transportation and storage.

With reference to the drawings, the tank therein illustrated as a preferred embodiment of the invention consists of two end sections 1 and 2 respectively, and a mid section 3. For purpose of identification, the end section 1 shall be designated as the nose section and the end section 2 as the tail section. Each of these sections may be pressed to shape from an integral piece of sheet metal, or it may be fabricated, by welding for example, from pre-shaped sections. Each end section is formed so that the portion 4 of the wall thereof which adjoins the edge or open end of the section will diverge toward said edge from the axial center line of the section, which center line is identified in Figure 2 by the broken line C—C. It will be noted also by reference to Figure 2 that each of the sections 1 and 2 is provided at its open end with a sleeve 6 which is secured by welding or by other suitable means to the inner surface of the wall at the edge of the latter. The tank illustrated is adapted for use on airplanes and is streamlined, said streamlining entailing somewhat different contours in nose section 1 and the tail section 2.

The midsection 3 is of open-ended generally barrel shaped contour and the wall is slit longitudinally so as to permit circumferential expansion to an extent admitting to the interior of said section the open end portions of the sections 1 and 2. Means is also provided for drawing the longitudinal edges of the slit together so as to seal the slit and to clamp the end sections 1 and 2 in the midsection.

This means is illustrated in Fig. 4 wherein the two edges of the longitudinal slit are designated respectively by the reference numerals 8 and 9. Secured to the inner face of the edge portion 8 by welding or other suitable means is a lip plate 11, said plate projecting beyond the said edge so as to underlap the opposed edge portion 9. To the outer face of the edge portion 8 is secured an angle plate 12 which also extends beyond the said edge and forms with the lip plate 11 a slotted recess which receives the edge portion 9. The angle plate 12 has at its inner end a flange 13 which extends outwardly in parallel relation to the edge 8 and is provided with a longitudinal series of apertures 14 which function for a purpose hereinafter described. The edge portion 9 has secured to the outer face thereof a terminal plate 15 which extends longitudinally of the edge, the outer edge portion 16 of this plate being offset from the surface of the edge section 9 so as to overlie the plate 12. The plate 15 has at its outer edge an outwardly projecting flange 17 which parallels the flange 13 and is provided with a longitudinal series of apertures 18 which are aligned respectively with the apertures 14 of the plate 12. These apertures receive bolts 19 by means of which the flanges 13 and 17 may be drawn together to thereby draw together the edges 8 and 9 as illustrated in Figure 4 wherein the said edges are shown in abutment at 21. It will be noted by reference to Figure 2 that the inner lip plate 11 terminates short of the ends of the midsection 3 so as to provide space for the inserted ends of the end sections 1 and 2 and so as to afford within the midsection 3 an inner surface at each end which will conform accurately to the adjoined surfaces of the end sections. The aforedescribed device constitutes in effect a releasable longitudinal seam in the midsection which function as hereinafter more fully described.

With reference more particularly to Figures 2 and 5, the midsection 3 is provided toward each end and in the interior thereof with a circumferentially arranged series of cams 22, said cams, preferably, being uniformly spaced in the respective series. Each of the cams is carried on the inner end of a threaded stud 23 which, as shown in Figure 5, extends outwardly through an aperture in the wall of the midsection and is held in place by a nut 24 threaded on the stud. The aperture 25 through which the stud extends may be effectively sealed through the medium of a washer 26 confined between the inner surface of the wall and the opposed surface of the cam. As illustrated in Figure 5 the cams are positioned so as to engage the outer faces of the sleeves 6 of the end sections, and each of the studs 23 is provided at its outer end with a slot 27, or other form of socket, for reception of a tool by means of which the stud, and with it the cam 22, may be turned from the exterior of the tank. By thus turning the stud 23, the cam 22 may be made to exert pressure against the sleeves 6 to forcibly displace the end sections 1 and 2 outwardly in the ends of the midsection 3, all as hereinafter more specifically set forth. The cams 22 may be locked in adjusted position by tightening the nut 24, and locking means is provided in each case in the form of a cap nut 28 which may be threaded on the outer end of the stud and against the outer face of the nut 24.

In assembling the sections, the bolts 19 are released so as to permit expansion of the midsection 3 to an extent admitting the open ends of the end sections 1 and 2 to the interior of the midsection. Thereafter the bolts 19 are tightened to close the seam at 21. Subsequently the cams 22 and 23 are actuated to displace the end sections 1 and 2 outwardly so as to tightly seal the joints between the ends of said sections and the ends of the midsection, the cams being secured in the final positions of adjustment and thereby acting to maintain the end sections 1 and 2 in the extended positions. Thereafter a split tubular casing element 29 may be applied as illustrated in Figure 4 to the flanges 13 and 17 so as to house said flanges and the bolts 19. The tanks may thus be rapidly and easily assembled in the field by means of simple tools. It will be apparent that gaskets or other packing elements may be used to seal the several seams and joints if such additional means is found desirable, such gaskets or elements being insertable, for example, between the opposed surfaces of the mid and end sections, and at 21 between the edges 8 and 9 of the midsection.

Particular attention is directed to the fact that by reason of the tapered form of the ends of the midsection and the complementary taper of the mating ends of the end sections, the aforedescribed relative displacement of the sections has the effect of wedging the said complementary tapered surfaces together with resulting formation of a thoroughly sealed joint. Such sealing is in effect independent of the clamping action of the bolts 19, so that in the longitudinal seam the edges 8 and 9 may be drawn together to any extent that may be necessary to produce a sealed joint in this seam, depending upon subsequent action of the cams, to finally seal the joints between the sections as described.

With reference now to Figure 6 it will be noted that by reason of the dished form of the end sections 1 and 2, these sections may be telescoped one within another so as to materially reduce the space required to stow these sections, and further that the two end sections when thus nested may occupy a position within the midsection 3 so that the three sections may be compactly stored in a space materially smaller than the space required for the assembled tank. Furthermore the design is such as to permit the nesting of the nose section of one tank within the nose section of another so that a number of such nose sections may be nested within a relatively small space as shown in Figure 6. A plurality of the tail sections 2 may be similarly nested within each other and when the nested tail sections are in turn nested with the nose sections as shown in the drawing, a relatively large number of such sections may be stored within a space no greater than that embraced by a single assembled tank. A corresponding number of midsections 3 may be similarly nested one within another with a corresponding saving in space. In Figure 6 the nose and tail sections for fifteen tanks have been nested together and stowed within two groups of nested midsections 3, one group containing eight of said midsections and the other seven, so that a space not materially greater than that required for one completed tank will accommodate the sections for fifteen complete tanks. The entire group of said sections may be crated as illustrated in Figure 6 to provide an extremely compact package containing the essential elements of the fifteen tanks. Obviously larger or smaller numbers of the various sections may be nested together with corresponding savings in space for transportation and storage.

It will be apparent that the tank as described is complete with the exception of the necessary fittings for filling the tank with fuel and for drawing off the fuel for use. These fittings may be separately packaged and may be installed in tapped openings provided in the sections for that purpose at the place where the tank is assembled.

We claim:

1. A tank comprising a tubular midsection and two cupped end sections, said end sections being adapted for assembly within the midsection with their open ends confined within the respective ends of the midsection, the said ends of the midsection tapering outwardly and the confined ends of the end sections having complementary tapers for wedging engagement within the tapering ends of the midsection, means including elements carried by the midsection in the interior thereof in position to engage the inner ends of said end sections for forcibly outwardly displacing said latter sections into the said wedged engagement with the midsection, means connected with said elements and extending through the wall of the midsection for actuating said elements from the exterior of the midsection, means for admitting said end sections to the interior of the midsection including a longitudinal slit in the wall and from one end of said midsection permitting radial expansion of said end for admission of the proximate end section, and means for releasably closing said slit.

2. A tank according to claim 1 wherein the said end section displacing elements consist of cams having actuating stems extending through wall of the midsection.

3. A tank according to claim 1 wherein the longitudinal slit extends from end-to-end of the midsection so as to provide for nesting of a plurality of said midsections, one within the other, and for insertion within such nested midsection assembly of a plurality of the cupped end sections similarly nested within each other.

DWIGHT P. ALLEN.
ROYALE WISE.

REFERENCES CITED

The following references are of record in the file of this patent:

UNITED STATES PATENTS

| Number | Name | Date |
|---|---|---|
| 783,776 | Cornell | Feb. 28, 1905 |
| 1,037,684 | Sutherland | Sept. 3, 1912 |
| 1,183,928 | Webb | May 23, 1916 |
| 1,201,003 | Van Duzer | Oct. 10, 1916 |
| 1,374,790 | Whitmore | Apr. 12, 1921 |
| 1,451,967 | Starclough | Apr. 17, 1923 |
| 1,474,052 | McLoon | Nov. 13, 1923 |
| 2,002,211 | Torney | May 21, 1935 |
| 2,233,270 | Ruhl | Feb. 25, 1941 |
| 2,300,259 | Kueppers | Oct. 27, 1942 |

FOREIGN PATENTS

| Number | Country | Date |
|---|---|---|
| 18,795 | Great Britain | 1913 |
| 219,249 | Great Britain | July 24, 1924 |
| 578,769 | Germany | June 17, 1933 |